3,053,734
GROWTH-PROMOTING COMPOSITIONS AND METHOD

Knut Bertil Högberg and Ove Birger Fernö, Halsingborg, Sweden, assignors to Aktiebolaget Leo (A/B Leo), Halsingborg, Sweden, a firm of Sweden
No Drawing. Filed Oct. 14, 1959, Ser. No. 846,253
12 Claims. (Cl. 167—53)

The present invention relates to certain compositions which are useful in promoting the growth of farm animals, and to a method of promoting growth in farm animals therewith. These compositions are especially valuable because, not only have they been found to be effective to produce the desirable effect of promoting growth over an unpredictably prolonged period upon systemic injection into a farm animal, but they are moreover surprisingly not absorbed upon oral administration to animals or humans. This of course means that farm animals to which these growth promoting compositions have been administered systematically may be consumed by humans without absorption into the human system of residual growth-promoting material, an important consideration in view of the uncertain risk involved in the human consumption of such residues.

It is accordingly an object of the invention to provide such novel growth-promoting compositions. Another object is the provision of a method for the promotion of growth in farm animals. Other objects will become apparent hereinafter.

Generically representative of the active principle of the compositions and method of the invention is an estrogenic polyphenol-phosphate (hereinafter sometimes abbreviated "PPP polymer") consisting essentially of polymeric chains of the formula:

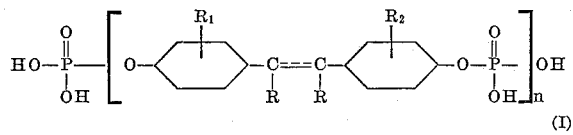

(I)

wherein $R_1$ and $R_2$ are selected from hydrogen and methyl, wherein from one to two R groups are selected from hydrogen and lower-alkyl, lower-alkenyl, and lower-alkylidene radicals containing not more than three carbon atoms, any remaining unsatisfied valencies of the two bridging carbon atoms being satisfied by hydrogen atoms or an additional bond between the two bridging carbon atoms, and wherein $n$ is a number sufficiently large that the molecular weight of the poly-phenol-phosphate polymer is higher than 2,000 (i.e. $n$ is 6–8) but not sufficiently large that the PPP polymer is insoluble in aqueous alkali. In these polymeric chains, however, the third valency of the phosphorus atoms which in Formula I is occupied by free hydroxy groups, may in some cases be linked to a phenol radical, whereby the chains will be branched. As shown in Table II branching is ordinarily limited to ten percent or less and the average molecular weight of the PPP polymer is preferably below 30,000 (i.e. $n$ is about 80).

In recent years, the use of artificial estrogens in the food-producing industry has become a widespread practice. The administration of estrogenic compounds to farm animals results in an improvement of weight gains and feed efficiency. Moreover the quality of the meat produced appears to be improved through marbling, i.e. the deposition of some of the fat within the muscle fibre. However, the use of estrogens in meat production presents certain health hazards, since estrogens may be harmful to man upon chronic administration. Several studies of estrogen residues in beef cattle and poultry have indicated that small amounts of estrogen activity may be found in the meat from the treated animals. Since these hormones are not destroyed by cooking, they are absorbed by man upon consumption of the treated meat. Such disadvantages are not inherent in the compositions and method of the present invention.

The advantage of the growth-promoting compositions and method of the present invention appears to be partly due to the high molecular weight and stability of the compound constituting the active principle thereof (the PPP polymer). These characteristics make the substances non-absorbable upon oral ingestion and, since the polyphenol-phosphates are very resistant to chemical hydrolysis, residues thereof in meat or animal internal organs, if any, present no hazard to the consumer, even after lengthy cooking or roasting. This has been conclusively established by the use of radioactive tracer technique employing labeled material.

The advantageous long-acting effect of PPP polymer compositions appears to be at least partly due to the fact that the high molecular weight PPP polymer molecule is only slowly hydrolyzed in the animal body whereby active synthetic estrogen units are produced. This hydrolysis apparently takes place via the influence of enzymes of the phosphatase type, against which PPP polymers and especially PSP (polydiethylstilbestrol phosphate) possess a pronounced antienzymatic effect, which means that the disintegration of the phosphoric acid ester polymers, which normally would be accomplished rather quickly, is delayed so that one obtains a uniform hormone liberation over an extended period of time. Accordingly, the anti-enzymatic effect of PPP polymers is of considerable value and is partly responsible for the effectiveness of PPP polymer compositions in fattening and finishing of farm animals according to the present invention.

The PPP polymer compositions produce a greatly prolonged estrogenic effect when administered parenterally. They have proved highly successful in the finishing and/or fattening of poultry, steers and heifers. If, for instance, a steer is treated with polydiethylstilbestrol phosphate (PSP), a single injection is enough to maintain the animal at a steady estrogen level (as indicated by continued growth-promotion) for about four months, with resulting most effective concurrent and simultaneous finishing and/or fattening of the animal. They can, however, also be employed in the finishing and/or fattening of other animals, e.g. lambs, where treatment with estrogens has already been used with success.

An example of the effectiveness of PPP polymer compositions in the treatment of steers is summarized for a PSP composition in Table I. In this representative experiment, four groups of 30 steers each were used. Two groups were not treated, while two groups of 30 steers each received a single injection of 240 milligrams of PSP-Na (the sodium salt of PSP).

This investigation was carried out at Colorado State University, Fort Collins, Colorado, U.S.A.

TABLE I

| Treatment | Control | | 240 mg.PSP-Na | |
| --- | --- | --- | --- | --- |
| No. of steers | 30 | 30 | 30 | 30 |
| No. of days fed | 110 | 110 | 110 | 110 |
| Avg. initial weight lb | 739.8 | 727.4 | 723.2 | 731.5 |
| Avg. final weight lb | 1,008.7 | 1,009.9 | 1,041.4 | 1,053.0 |
| Avg. daily gain (periodic), lb.: | Avg. | | Avg. | |
| 25 days | 3.08 | 3.09 3.09 | 3.80 3.95 | 3.87+.78 |
| 23 days | 2.77 | 3.21 2.99 | 2.87 3.29 | 3.08+.09 |
| 28 days | 2.45 | 2.80 2.63 | 3.06 2.64 | 2.85+.22 |
| 28 days | 2.13 | 1.79 1.96 | 2.30 2.44 | 2.37+.41 |
| 13 days | 1.42 | 1.63 1.52 | 2.21 1.78 | 2.00+.48 |
| Avg. daily gain (cumulative), lb.: | | | | |
| 25 days | 3.08 | 3.09 3.09 | 3.80 3.95 | 3.87+.78 |
| 48 days | 2.93 | 3.15 3.04 | 3.35 3.64 | 3.50+.46 |
| 76 days | 2.79 | 3.04 2.92 | 3.26 3.33 | 3.29+.37 |
| 104 days | 2.59 | 2.68 2.63 | 2.98 3.08 | 3.03+.40 |
| 117 days | 2.46 | 2.56 2.51 | 2.89 2.92 | 2.91+.40 |
| Avg. carcass yield percent | 60.2 | 59.3 59.8 | 59.3 60.1 | 59.7 |
| Avg. carcass grade | 7.80 | 7.69 7.75 | 7.59 7.79 | 7.69 |

Summarizing the data shown in Table I, the results with regard to periodic and cumulative gains for the duplicated control and treated groups were rather uniform. Weight gains were surprisingly high and seemed to be maintained quite well over a long time in that the PSP-Na treated groups showed an advantage in average daily gain over the control of 0.40 pound during 117 days of treatment.

Since it has already been demonstrated that, when more than 30 milligrams of diethylstilbestrol (DES) in pellet form is used for growth-promoting purposes, the quality of the cattle is seriously affected, these animals were closely watched as it was expected that, with such a high level of available DES in the absence of either androgen or progestogen, the steers would go out of shape. However, no detrimental effect on conformation was noted. Practically all steers graded choice and the yield was around 60%. This means that the carcass yield was virtually the same as in untreated animals so that the weight gain was not due merely to water uptake but rather represented a true protein anabolic effect.

These results obtained with the compositions and method of the invention have been substantiated in further experiments in the United States as well as in Sweden. In Sweden, experiments have been carried out with a group of identical twin steers. The treated animals showed an advantage in average daily gain over the control of 0.52 pound during 96 days of treatment.

Although a dosage of diethylstilbestrol of 10 mg./day per os has heretofore been considered optimum for growth-promotion in steers, when PPP polymer compositions have been given together with this amount of oral diethylstilbestrol (DES), the weight gain of the farm animal, especially females and heifers, has been found to be still further increased. In fact, the total weight gain was greater than the additive weight gain obtained by separate administration, so that the two approaches taken together, or at the same time, appear to give an at least additive growth-promoting result.

Summarizing the results obtained using PSP compositions in the fattening of farm animals, it is possible to state that they are superior to and longer-acting than the generally used DES compositions as growth-promoting agencies and, in addition, have the advantage of not being absorbed upon oral ingestion. The same statement exactly can be made in describing the advantages of other PPP polymer compositions when compared with compositions of their estrogenically active parent phenol compound.

PSP and other PPP polymers are water soluble in the form of their organic and inorganic salts, for example, their sodium, potassium, calcium, ammonium, pyridine, diethanolamine and piperidine salts, and are preferably administered as aqueous solutions. It is also possible to use any other pharmacologically-acceptable non-toxic hydrophilic solvent, e.g. 1,2-propanediol, glycerin, glycol, Cellosolve, or polyethylene glycol, as a vehicle for the PPP polymer. Besides water, 1,2-propanediol and other non-toxic hydrophilic solvents, the solution may advantageously contain a preservative, for example, methyl-hydroxy-benzoate or propyl-hydroxy-benzoate or combinations thereof, sorbic acid, cetyl pyridinium chloride, or the like, in amount up to about 0.2% weight/volume, thus minimizing the risk of bacterial growth when using multidose vials.

It is also possible to use PPP polymers in the form of a pellet, together with the usual binders, excipients and adjuvants, which is administered as an implantation, but this is not preferred due to the undesirably large size of the pellet required for single administration dosage and the hazards of encapsulation following administration by this route.

While the method of the invention consists generally in systematically administering the PPP polymers or a salt thereof, in a pharmaceutically acceptable form, to a farm animal, intramuscular or subcutaneous administration is preferred. The site of administration is preferably the ear of the animal (subcutaneous), except with poultry where the preferred site of administration is high in the neck.

Dosage necessary to produce the desired results will obviously vary greatly with the species treated. From 0.25 to 1.0 milligram per pound is the most effective dosage for steers, with from about 0.4 to 0.6 milligram per pound appearing to be optimum. Thus, for the finishing of steers of about 600–1200 pounds weight, preferably in the lower part of this weight range, a single injection of 225–400 milligrams, preferably 250–300 milligrams, has been found eminently effective. For the fattening of poultry, thirty milligrams per bird is extremely effective with from five to twenty milligrams per pound being the indicated dosage range. The foregoing dosage figures are particularly satisfactory with the use of PSP, in the form of a salt, e.g., its sodium salt, and, for attainment of equally satisfactory results, adjustment should of course be made when employing poly-phenol-phosphates incorporating parent estrogens of a lesser intrinsic estrogenic activity than DES.

The concentration of the poly-phenol-phosphate in the selected dosage form may be varied considerably, with a concentration of about 50 to 100 milligrams per milliliter of solvent being an established effective concentration range. Thus from about 225–400 milligrams of the PPP polymer, for example PSP, in the form of a salt, e.g., its sodium salt, may be effectively administered in from 4 to 5 milliliters of solvent.

*Stability*

Table II shows some chemical properties of some PPP polymers prepared from synthetic estrogens.

The hydrolysis experiments of Table II were run at 100° C. between pH 3 and 10 (0.1 M buffer solution) and in 0.2 N sodium hydroxide solution. The rate of hydrolysis was followed by determining the amount of inorganic phosphorus ($P_o$) liberated. The formation of $P_o$ was most rapid at pH values between 3 and 6, practically all $P_o$ being liberated within 10 hours. Practically no $P_o$ was liberated on hydrolysis in 0.2 N NaOH solution.

At pH 5.0 (acetate buffer) the hydrolysis of diethylstilbestrol diphosphate was found to follow a first order reaction with $k=0.87$ $h^{-1}$. Under the same conditions when calculated on hydrolyzable phosphorus only (see Table II), the rate of hydrolysis for various poly-diethylstilbestrol-phosphate preparations was found to be virtually the same. Poly-dienestrol-phosphate and poly-hexestrol-phosphate were found to have k-values of 0.94 and 0.71 $h^{-1}$, respectively.

These results, and their correlation with titration analytical results, indicate that inorganic phosphorus liberated on hydrolysis is formed from primary phosphoric acid esters only.

Toxicity

The acute toxicity of PSP was estimated in spayed female mice 48 hours following a single intravenous injection. LD 50 was found to be 252 mg./kg., with 95% fiducial limits of error at 232 and 273 mg./kg., respectively.

When male albino rats were injected intramuscularly with doses up to 10 mg./kg. of PSP, and sacrificed 10 weeks after the injection, no gross pathological changes could be seen either at autopsy or on microscopical examination, except those attributable to the typical action of an efficient and prolonged estrogen such as decrease in the weight of accessory reproductive organs and gynaecomastia in the highest dosages administered. The low toxicity of PSP suggests that it can probably be administered also to human beings without any major harmful effects.

Biological Activity

The duration of action of the various poly-phenol-phosphates was determined by the use of a method based on the duration of vaginal cornification in spayed mice. The relative potencies of the different compounds when compared to the acivity of PEP—a high molecular weight polyestradiol phosphate described by O. Fernö et al. in Acta Chem. Scand. 12 (1958) 1675—are summarized in Table III. It appears from the data that polymeric phosphates prepared from dienestrol and hexestrol exhibit a shorter duration of estrogenic activity than similar compounds prepared from diethylstilbestrol. It also appears that a commercial preparation of diethylstilbestrol diphosphate is virtually devoid of prolonged estrogenic activity. When PSP was hydrolyzed at 100° C. for 27 hours at pH 7.6 (21.2% $P_o$ liberated), its biological potency remained unchanged.

The polymeric phosphates prepared from dienestrol and hexestrol exhibit a reduced anti-alkaline phosphatase activity, and a somewhat reduced anti-beta-glucuronidase activity, when compared to PSP. However, their effect on hyaluronidase and acid phosphate appears to be of the same order.

Table III shows some biological and pharmacological properties of some PPP polymers prepared from synthetic estrogens.

TABLE II
CHEMICAL PROPERTIES OF SOME POLYMERIC PHOSPHATES PREPARED FROM SYNTHETIC ESTROGENS

| No. | Compound | Molar ratio $POCl_3$: estrogenic phenol | Reaction time (hours) | Percent non-dialyzable P org. | Percent $P$ [1] | Percent free hydroxyl groups [2] | Percent hydrolyzable phosphorus [3] $-P(O)(OH)_2$ | Percent phosphorus [4] as— $-P(O)(OH)_2$ | $\equiv PO$ | $=P(O)OH$ |
|---|---|---|---|---|---|---|---|---|---|---|
| 1 | PSP | 0.8 | 70 | 39 | 7.6 | 10 | 3 | 5 | 23 | 72 |
| 2 | PSP | 0.9 | 70 | 85 | 8.2 | 10 | 7 | 8 | 17 | 75 |
| 3 | PSP | 1.0 | 70 | 87 | 8.9 | 4 | 14 | 13 | 11 | 76 |
| 4 | PSP | 1.1 | 5 | 66 | 9.0 | 30 | 30 | 30 | 11 | 59 |
| 5 | PSP | 1.1 | 25 | 79 | 9.6 | | 25 | 26 | 9 | 65 |
| 6 | PSP (Sample A, Prep. 11) | 1.1 | 70 | 83 | 9.8 | 0 | 25 | 24 | 8 | 68 |
| 7 | PSP | 1.2 | 70 | 79 | 10.4 | | 35 | 33 | 6 | 61 |
| 8 | Polydienestrol phosphate | 1.1 | 70 | 75 | 9.4 | | 23 | 24 | 13 | 63 |
| 9 | Polyhexestrol phosphate | 1.1 | 70 | 77 | 9.5 | | 24 | 24 | 16 | 60 |
| 10 | Diethylstilbestrol diphosphate | | | | 14.7 | 0 | 100 | 100 | 0 | 0 |
| 11 | No. 10—Commercial sample | | | | | | | | | |

[1] Calculated on samples free from moisture, pyridine and chlorine.
[2] According to B. Baggett et al., J. Biol. Chem. 213, 87 (1955). Calculated as percent of "estrogen oxygens"; indicative of some chain branching (in all cases 10X or less).
[3] Hydrolysis at 100° C. for 27 hours at pH 5.0 (0.1 M acetate buffer.)
[4] From titration experiments. Results corrected for pyridine and chlorine. Indicates inorganic phosphorus liberated on hydrolysis (footnote 3) is formed from primary phosphoric acid esters only.

TABLE III
BIOCHEMICAL AND PHARMACOLOGICAL PROPERTIES OF SOME POLY-PHENOL-PHOSPHATES

| No. | Compound | Relative amount P.E.P=1.0 of inhibitor necessary for 50% inhibition | | | | Duration of estrogenic effect[1] |
|---|---|---|---|---|---|---|
| | | Hyaluronidase | Alkaline phosphatase | Acid phosphatase (pH 4.5, disodium p-nitrophenyl phosphate substrate) | Beta-glucuronidase (bacterial) | |
| 1 | PSP | 1.0 | 113 | 1.0 | 0.36 | 63 |
| 2 | PSP | 0.7 | 40 | 0.6 | 0.13 | 100 |
| 3 | PSP | 0.6 | 27 | | 0.12 | 100 |
| 4 | PSP | 0.7 | 10 | 1.0 | | 97 |
| 5 | PSP | 0.7 | 17 | 0.7 | | 104 |
| 6 | PSP (Sample A, Prep. 11) | [2] 0.6 | [2] 17 | [2] 0.6 | 0.14 | 102 |
| 7 | PSP | 0.7 | 15 | 0.5 | 0.12 | 107 |
| 8 | Poly-dienestrol-phosphate | 0.7 | 43 | 1.2 | 0.20 | [3] 41 |
| 9 | Poly-hexestrol-phosphate | 0.7 | 87 | 0.6 | 0.28 | [3] 24 |
| 10 | Diethylstilbestrol diphosphate | 800 | 19 | 1,000 | | |
| 11 | No. 10—commercial source | 160 | 18 | 46 | 12 | [3] 1 |
| 12 | P.E.P | 1.0 | 1.0 | 1.0 | 1.0 | 100 |

[1] Duration is estimated based on duration of vaginal cornification in spayed mice according to method of Diczfalusy et al., Endocrinology 60, 581 (1957). Potency is expressed as a percentage of the effect of an arbitrarily selected polyestradiol-phosphate standard.
[2] Figures practically unchanged after hydrolysis (27 hr., pH 5.0 100° C.).
[3] These potency estimates are only approximate values calculated from the results obtained at the same dose levels (5 and 10 micrograms, respectively) as were employed with PSP. These data are included only to demonstrate that the duration of activity of these PPP polymers is far greater than that of parent estrogenic phenols or their simple phosphates.

Table IV shows the duration of estrogenic effect of a single injection of poly-phenol-phosphates according to the present invention and their corresponding non-phosphorylated synthetic estrogen monomers. The method of assay employed in this determination is described by Diczfalusy et al., Endocrinology 60, 581 (1957), which is based on the duration of vaginal cornification in spayed mice. Each figure in the table indicates mean values and is based on 20 to 25 animals with the poly-phenol-phosphates and 10 to 15 animals with the corresponding synthetic estrogen monomer. The duration of estrogenic effect of a single injection of the poly-phenol-phosphates, as will be seen from the table, is much greater, in every case tested from 200%–300% of the duration of estrogenic effect obtained by administration of a single injection of the corresponding synthetic estrogen monomer. Although this is a remarkable increase in duration of estrogenic effect, the difference in species between the mouse and a steer, with corresponding difference in their enzyme systems, must amount, among other things, for the fact that a 250 mg. dose of No. 1 is effective over a four-month period to promote growth in a steer, while the effect of a maximum dose of No. 4, which must be in an amount less than 30 mg., is of only a short duration in a steer. These figures are therefore presented only to illustrate the striking difference in duration of effect of the PPP polymer in contrast to its corresponding monomer as evidenced by experiments in the mouse and all evidence indicates that the growth promoting effect thereof in a steer is of even longer duration and, in contrast, even more striking.

TABLE IV
RELATIVE DURATION OF ESTROGENIC EFFECT

| Compound | Dose in micrograms | Duration of estrogenic effect (days) |
| --- | --- | --- |
| 1. Poly-diethylstilbestrol-phosphate | 10 | 15.7 |
| 2. Poly-dienestrol-phosphate | 10 | 8.4 |
| 3. Poly-hexestrol-phosphate | 10 | 5.5 |
| 4. Diethylstilbestrol | 10 | 4.6 |
| 5. Dienestrol | 10 | 3.4 |
| 6. Hexestrol | 10 | 2.5 |

The starting estrogenic parent compounds (herein generically referred to as "phenols") for these poly-phenol-phosphates may be represented by the general formula:

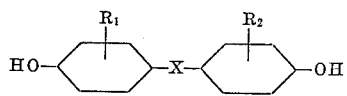

in which X is a carbon bridge of 2 carbon atoms and $R_1$ and $R_2$ each represents hydrogen or a methyl group. X is preferably an ethylene radical, i.e., the compounds are stilbenes. The carbon atoms of the carbon bridge may also carry, instead of hydrogen atoms, one or two alkyl, alkenyl or alkylidene groups, the number of carbon atoms in each such substituent being 1, 2 or 3. Diethylstilbestrol is the preferred parent compound.

Examples of representative parent estrogenic phenols are 4,4'-dihydroxy-alpha-isopropyl-stilbene,
4,4'-dihydroxy-alpha-methyl-beta-n-propylstilbene
4,4'-dihydroxy-alpha-ethyl-beta-propenylstilbene,
4,4'-dihydroxy-alpha,2-dimethyl-beta-ethylstilbene,
4,4'-dihydroxy-alpha,beta,3,3'-tetramethylstilbene,
p,p'-dihydroxydiphenylethane,
4,4'-dihydroxy-2-methyldiphenyl-alpha-methylethane,
4,4'-dihydroxydiphenyl-alpha,alpha-dimethylethane,
4,4'-dihydroxy-alpha,beta-bis-n-propyldiphenylethane.
4,4'-dihydroxy-alpha,2-dimethyl - beta - ethyl - diphenylethane,
4,4'-dihydroxy-alpha-ethyl-beta - ethylidene - diphenylethane, and
4,4'-dihydroxy-3,3'-dimethyl-gamma,delta-diphenyl - beta-delta-hexadiene.

Still others are apparent from the following preparations.

The poly-phenol-phosphates, such as those represented by Formula I, are prepared by condensing or esterifying the starting estrogenic phenol, having the requisite two hydroxyl groups, with an excess of a phosphorus oxyhalide such as phosphorus oxychloride, preferably but not necessarily in the presence of an acid-binding agent such as pyridine, and hydrolyzing the reaction product to convert existing chlorine atoms to hydroxyl groups, thereby lending to the polymeric products the desirable characteristic of water-solubility in the form of their alkaline salts. It will be recognized that a reaction ratio of .666 mole of phosphorus oxyhalide to one mole of phenol, which would be the theoretical equivalent ratio, the product contains upon complete reaction no unreacted halogen atoms for subsequent hydrolysis and is a neutral substance which is completely insoluble in aqueous alkali. For this reason, it is apparent that an excess of the phosphorus oxyhalide is preferably employed so that subsequent hydrolysis of the halogen atoms of the polymer produces a product of the above formula and desirable solubility characteristics. Usually, from 0.7 to about 1.2 mole of phosphorus oxyhalide per mole of phenol is employed, to minimize chain branching, although considerably greater excesses of phosphorus oxyhalide may be employed without undesirable effect, so long as the poly-phenol-phosphate, upon hydrolysis of the halogen atoms to hydroxy groups, is water-soluble at least in the form of its alkaline salts.

It is of substantial importance that the degree of polymerization of the poly-phenol-phosphates be sufficiently high. In accordance herewith, the lower limit for the molecular weight is about 2,000, which means that about 6–8 organic radicals are connected in the manner indicated by Formula I, and that they do not dialyze through a cellophane membrane. At a molecular weight of about 2,000 (centrifuge), the prolonged estrogenic and growth-promoting effect is strong as compared with that of corresponding parent compounds and monomeric mono- and di-phosphates. By increasing the molecular weight to values between 10,000 and 30,000 (centrifuge), which can be effected for instance by increasing the reaction time for the phosphorylation of the parent compound, e.g., to five hours or longer, products are obtained which exert a much stronger growth-promoting effect. These high molecular weight substances are therefore especially desirable, with a molecular weight of 10,000–20,000 (centrifuge) being preferred. In terms of molecular weight, the optimum appears to be about 14,000–15,000 (centrifuge) (about 35–45 organic moieties), especially for PSP, and despite the fact that some chain branching may occur, the molecular weight and extent of chain branching must only be maintained sufficiently low that the products are still soluble in aqueous alkali.

As previously stated, the poly-phenol-phosphates are prepared by reacting a phosphorus oxyhalide such as phosphorus oxychloride with one or more parent estrogenic phenols under condensation conditions, preferably but not necessarily using a tertiary amine as a hydrogen halide-binding agent, after which the resulting condensation products are subjected to hydrolysis to split off the groups, e.g. chlorine atoms, which in the phosphorus oxyhalide are linked to the phosphoric acid residue and which have not been replaced, during the condensation process, by organic radicals. These halogen atoms are replaced upon hydrolysis by hydroxy groups, whereby free phosphoric acid groups are formed, so that one or two of the valencies of the phosphorus are linked with an organic group through an oxygen atom whereas the remaining one or two valencies are linked to hydroxy groups. The products thereby become strongly acid and capable of forming salts. Their alkali salts are water soluble. The salts of the poly-phenol-phosphates may conveniently be prepared, by neutralizing the poly-phenol-phosphate in question, with an aqueous solution of a base such as sodium hydroxide, potassium hydroxide, pyridine, diethanolamine and piperidine, thereby obtaining a clear solution. As the PPP polymers are preferably administered as aqueous solutions of non-toxic salts it is ordinarily not necessary to isolate the salts in solid form. The salts may, however, generally be obtained in solid form, for example by adding ethanol to a concentrated aqueous solution of the salt in question and filtering off the precipitated salt.

During phosphorylation, the parent phenol compound may suitably be dissolved in a solvent which is not reacted upon by the phosphorus oxyhalide. An appropriate procedure is characterized by maintenance of anhydrous conditions with cooling during the phosphorylation, adding the phosphorus oxyhalide to the condensation medium slowly, adding the same periodically, permitting the reaction mixture to stand for some time prior to hydrolysis, or by other similar procedure, until the desired degree of condensation is obtained, and then discontinuing the condensation. To obtain a sufficient degree of condensation it is preferable not to use too great in excess of the phosphorus oxyhalide, in the case of phosphorus oxychloride, preferably 0.7–1.2 mole of phosphorus oxychloride per mole of the parent phenol compound, although greater excesses may be used if desired. It is expedient for best control of the reaction to add the phosphorus oxyhalide to a solution of the parent compound and not the reverse, since in the latter case the phosphorus oxyhalide would be present in great excess at the beginning of the process.

Examples of suitable ketone solvents for the reaction are methylethylketone, methyl-n-propylketone, diethylketone, hexanone-2 pinacolin, and di-n-propylketone. Examples of suitable halogenated solvents are chloroform, ethylene chloride and ethylidene chloride. These and other solvents may be used alone or in mixtures. The solvent may also consist of the acid-binding agent used in the process, for instance a tertiary amine, among which pyridine, picoline, lutidine, quinoline and dimethylaniline may be mentioned. In certain cases it may be expedient to use such condensation agents mixed with indifferent solvents.

The reaction temperature is generally not critical. Since heat is evolved during the phosphorylation, it is preferred to cool the reaction mixture fairly strongly in order to regulate the process. It will generally be necessary to allow the reaction mixture to stand for shorter or longer periods before hydrolyzing in order that the polymerization may attain the degree desired in the final product. In many cases it is expedient to leave the reaction mixture standing at room temperature, i.e. about 15–20 C., for ½ to 24 hours. A five-hour reaction period is usually sufficient. This period of standing may be reduced by increasing the temperature, and generally there seems to be no disadvantage in increasing the temperature to as much as 50° C. during the period of standing. The reaction is then either allowed to go to completion or terminated by diluting the reaction mixture with ice water, whereby also any excess of phosphorus oxyhalide is destroyed, or other suitable procedure for hydrolysis of the chlorine atoms may be employed.

The following preparations and examples are given by way of illustration only, and are not to be construed as limiting.

*Preparation 1.—Poly-[p,p'-Dihydroxydiphenylethane]-Phosphate*

2.14 grams of p,p'-dihydroxydiphenylethane are dissolved in 20 ccs. of anhydrous pyridine. At −15° C. a solution of 0.62 cc. of phosphorous oxychloride in 5 ccs. of anhydrous pyridine is added dropwise with shaking. Time of addition: 3 minutes. At the addition an insignificant heating takes place. After some hours in the cooling bath, a copius precipitate of pyridinium chloride has formed. The mixture is then left for 15 hours at 0° C., whereafter its consistency is jelly-like. It is then hydrolyzed with finely crushed ice, whereby a clear solution is obtained. To this solution 75 ccs. of 5 N hydrochloric acid are added. Thereby a fine-grained precipitate is obtained which is removed by suction, washed with water and dried in a desiccator over phosphorus pentoxide. It is an almost white powder, yield 2 grams. The product is difficultly soluble in a solution of sodium bicarbonate but easily soluble in a solution of sodium hydroxide.

*Preparation 2.—Poly-[3,4-Bis-(p-Hydroxyphenyl)-Hexane]-Phosphate*

2.7 grams of 3,4-bis-(p-hydroxyphenyl)-hexane are dissolved in 120 ccs. of anhydrous pyridine. At −15° C. a solution of 0.92 cc. of phosphorus oxychloride in 10 ccs. of anhydrous pyridine is added dropwise with shaking. Time of addition: 5 minutes. After 1 hour in the cooling bath and 20 hours at room temperature, the clear solution is hydrolyzed with crushed ice and evaporated in a vacuum. The residue is dissolved in 20 ccs. of 1 N sodium hydroxide solution and the solution obtained is added with stirring to 25 ccs. of 5 N hydrochloric acid whereby a white precipitate is obtained. Yield after drying: 3.3 grams.

*Preparation 3.—Poly-[(4,4'-Dihydroxy-2-Methyldiphenyl)-Alpha-Methylethane]-Phosphate*

2.42 grams of (4,4'-dihydroxy-2-methyldiphenyl)-alpha-methylethane are dissolved in 30 ccs. of anhydrous pyridine. At −15° C. a solution of 0.92 cc. of phosphorus oxychloride in 5 ccs. of anhydrous pyridine is added dropwise with shaking. Time of addition: 3 minutes. The mixture is left for 20 hours at room temperature, after which time it has become jelly-like. It is then hydrolyzed with crushed ice, and warmed to 85° C. for 2 hours whereby a clear solution is obtained. This is evaporated in a vacuum, the residue is dissolved in 20 ccs. of 1 N sodium hydroxide solution and the solution obtained is added with stirring to 25 ccs. of 5 N hydrochloric acid, whereby a white precipitate is obtained. Yield after drying: 2.9 grams.

*Preparation 4.—Poly-[Gamma, delta-(4,4'-Dihydroxydiphenyl)-Beta, Delta-Hexadiene]-Phosphate*

1.33 grams of gamma, delta-(4,4'-dihydroxydiphenyl)-beta, delta-hexadiene are dissolved in 20 ccs. of anhydrous pyridine. The solution is cooled to −14° C., whereafter a solution of 0.31 cc. of phosphorus oxychloride in 5 ccs. of anhydrous pyridine is added dropwise with shaking. Time of addition: 3 minutes. At the addition an insignificant heating occurs. The mixture is left for a further 3 hours in the cooling bath and then for 20 hours at 0° C. After this time the mixture has become jelly-like. It is then hydrolyzed with finely crushed ice, whereby a clear solution is obtained. To this solution 75 ccs. of 5 N hydrochloric acid are added, whereby after drying 1.6 grams of a light beige (cream colored) powder is obtained. This product is difficultly soluble in a solution of sodium bicarbonate but easily soluble in sodium hydroxide.

*Preparation 5.—Poly-[Gamma, Delta-(4,4'-Dihydroxy-3,3'-Dimethyldiphenyl)-Beta, Delta-Hexadiene]-Phosphate*

2.94 grams of gamma, delta-(4,4'-dihydroxy-3,3'-dimethyldiphenyl)-beta, delta-hexadiene are dissolved in 60 ccs. of anhydrous pyridine. At −15° C. a solution of 1 cc. of phosphorus oxychloride in 10 ccs. of anhydrous pyridine is added dropwise with shaking. Time of addition: 5 minutes.

The mixture is left for 1 hour in the cooling bath and then for 24 hours at room temperature. It is then hydrolyzed with finely crushed ice whereby a clear solution is obtained. This is evaporated in a vacuum to ¼ of the volume. The viscous residue is dissolved in about 40 ccs. 1 N sodium hydroxide solution (to pH 7). The solution is dialyzed against flowing water for 5 days and is then added with stirring to 20 ccs. of 5 N hydrochloric acid, whereby a white precipitate is obtained. This is removed by suction and washed with water whereafter it is dried in a vacuum desiccator over phosphorus pentoxide. Yield 3.5 grams.

*Preparation 6.—Poly-[4,4'-Dihydroxy-Alpha, Beta-Diethylstilbene]-Phosphate*

13.3 grams of 4,4'-dihydroxy-alpha, beta-diethylstilbene are dissolved in 300 ccs. of anhydrous pyridine. At −15° C. a solution of 5.0 ccs. of phosphorus oxychloride in 35 ccs. of anhydrous pyridine is added dropwise with shaking. Time of addition: 15 minutes. The mixture is left for 1 hour in the cooling bath and then for 20 hours at room temperature. It is then hydrolyzed with 200 grams of finely crushed ice whereby a clear solution is obtained. This is evaporated in a vacuum to ¼ of the volume. The viscous residue is dissolved in about 200 ccs. of 1 N sodium hydroxide solution (to pH 7). The solution is dialyzed against flowing water for 5 days and is then added with stirring to 60 ccs. of 5 N hydrochloric acid whereby a white precipitate is obtained. This is removed by suction and washed with water whereafter it is dried in a vacuum desiccator over phosphorus pentoxide. Yield 16.1 grams of a white powder which is readily soluble in sodium hydroxide solution.

*Preparation 7.—Poly-[4,4'-Dihydroxy-Alpha-Methyl-Beta-n-Propylstilbene]-Phosphate*

2.68 grams of 4,4'-dihydroxy-alpha-methyl-beta-n-propylstilbene are dissolved in 30 ccs. of anhydrous pyridine. At −10° C. a solution of 0.92 cc. of phosphorus oxychloride in 5 ccs. of pyridine is added dropwise with shaking. Time of addition: 2 minutes. The mixture is left for 20 hours at room temperature, after which time it has become jelly-like. It is then hydrolyzed with crushed ice, and left at room temperature for 3 days whereby a clear solution is obtained. To this solution 150 ccs. of 5 N hydrochloric acid are added. Yield after drying, 3.1 grams of white powder.

*Preparation 8.—Poly-[4,4'-Dihydroxy-Alpha-Isopropylstilbene]-Phosphate*

2.54 grams of 4,4'-dihydroxy-alpha-isopropylstilbene are dissolved in 60 ccs. of anhydrous pyridine. At −15° C. a solution of 1.2 ccs. of phosphorus oxychloride in 10 ccs. of anhydrous pyridine is added dropwise with shaking. Time of addition: 5 minutes. After 1 hour in the cooling bath and 20 hours at room temperature the clear solution is hydrolyzed with crushed ice and evaporated in a vacuum. The residue is dissolved in 20 ccs. of N sodium hydroxide solution and the solution obtained is added with stirring to 25 ccs. of 5 N hydrochloric acid, whereby a white precipitate is obtained. Yield after drying: 3.0 grams.

*Preparation 9.—Poly-[4,4'-Dihydroxy-Alpha-Ethyl-Beta-Propenylstilbene]-Phosphate*

2.80 grams of 4,4'-dihydroxy-alpha-ethyl-beta-propenylstilbene are dissolved in 60 ccs. of anhydrous pyridine. At −15° C. a solution of 0.83 cc. of phosphorus oxychloride in 5 ccs. of anhydrous pyridine is added dropwise with shaking. Time of addition: 3 minutes. After 1 hour in the cooling bath and 5 hours at room temperature the clear solution is hydrolyzed with crushed ice and evaporated in a vacuum. The residue is dissolved in 20 ccs. of 1 N sodium hydroxide solution and the solution obtained is added with stirring to 25 ccs. of 5 N hydrochloric acid, whereby a white precipitate is obtained. Yield after drying: 3.4 grams.

*Preparation 10.—Poly-[4,4'-Dihydroxy-Alpha, Beta, 2,2'-Tetra-Methylstilbene]-Phosphate*

2.68 grams of 4,4'-dihydroxy-alpha, beta, 2,2'-tetramethylstilbene are dissolved in 30 ccs. of anhydrous pyridine. At −15° C. a solution of 0.69 cc. phosphorus oxychloride in 5 ccs. of anhydrous pyridine is added dropwise with shaking. Time of addition: 3 minutes. The mixture is left for 20 hours at room temperature, after which time it has become jelly-like. It is then hydrolyzed with crushed ice, and warmed to 85° C. for 2 hours whereby a clear solution is obtained. This is evaporated in a vacuum, the residue is dissolved in 20 ccs. of 1 N sodium hydroxide solution, and the solution obtained is added with stirring to 25 ccs. of 5 N hydrochloric acid, whereby a white precipitate is obtained. Yield after drying: 2.9 grams.

*Preparation 11.—Poly-Diethylstilbestrol-Phosphates (P.S.P.)*

In the preparation of different batches, the molar ratio $POCl_3$/diethylstilbestrol was varied between 0.8 and 1.2/1. Dialysis was carried out against distilled water containing 1% NaCl, and the poly-diethylstilbestrol-phosphate preparations were precipitated by HCl without addition of ethanol. Using molar ratios of $POCl_3$/diethylstilbestrol between 0.8 and 1.0, it was found that the mixture had changed into a jelly after 10 to 20 hours reaction time. After hydrolysis of these jellies with ice, it was necessary to heat on a steam bath for 1–2 hours with stirring in order to obtain a clear solution. No inorganic phosphorus was liberated during heating. No jelly formation took place when the molar ratio of $POCl_3$/diethylstilbestrol was higher than 1.0. With a reaction time of 70 hours, the yields from 5 grams diethylstilbestrol varied between 5.5 and 5.7 grams of crude polymer. The various poly-diethylstilbestrol-phosphates were analyzed for moisture (in vacuo 100° C.; found 1–2%), pyridine (determined spectrophotometrically after alkalization and distillation; found 1–3%), chlorine (found 0–0.5%), and phosphorus (see Table II).

The poly-diethylstilbestrol-phosphate obtained with 1.1 mole $POCl_3$ and with a reaction time of 70 hours has a melting range of 195–205° C. This PSP product is referred to below as Sample A, has a molecular weight of about 14,000, and is the PSP product employed in the experiments of Table I and in the dosage and concentration discussion and other weight-gain studies referred to earlier in this specification.

ANALYSIS OF P.S.P. (SAMPLE A)

Moisture: 1.7%; pyridine: 2.9%; chlorine: 0.3%; P, O, and H (calculated on sample free from moisture, pyridine and chlorine) 9.8%; 63.1% and 5.8% respectively. P.S.P. (free from moisture, pyridine and chlorine) thus contains 78.3% diethylstilbestrol. Molar ratio P/diethylstilbestrol: 1.08.

P.S.P. is very soluble in aqueous pyridine, soluble in aqueous alkali, slightly soluble in dry pyridine, ethanol and ethanol-water (1:1), and very slightly soluble in water, dioxane, acetone and chloroform.

*Preparation 12.—Poly-Dienestrol-Phosphate and Poly-Hexestrol-Phosphate*

These polymers were prepared in the same manner as described for P.S.P. in Preparation 11. A reaction ratio of 1.1 mole of $POCl_3$ to 1.0 mole of starting estrogenic phenol, a reaction time of about 70 hours, and a reaction temperature of about room temperature, are preferred. No jelly was formed under such conditions.

EXAMPLE.—POLY-PHENOL-PHOSPHATE COMPOSITIONS

The poly-phenol-phosphates from each of the preceding preparations are incorporated into pharmacologically acceptable dosage forms and employed in the following manner.

Water (which need not be, but which preferably is sterile), to which 0.1% of a mixture of methyl-hydroxybenzoate and propyl-hydroxy-benzoate has been added as a preservative, is combined with the estrogenically-active PPP polymer, in the form of its sodium salt, in such amounts that the concentration of the PPP polymer is between 50 and 100 milligrams per milliliter of solvent. Upon mixing, the PPP polymer goes readily into solution, and the resulting solution is filled into vials of either unitary or multidose variety.

Sufficient of the solution is withdrawn from the vial with a large-bore syringe to provide a dose of between about 225 and 400 milligrams of the estrogenically-active PPP polymer. This dose is suitable for subcutaneous administration into the ear of a 600 pound steer, in each case to effect growth-promotion of long duration compared with the parent estrogen.

In the same manner, solutions and dosage forms incorporating other preservatives and hydrophilic solvents, if desired with addition of a local anesthetic, such as lidocaine or procaine, are prepared and employed to promote the growth of farm animals.

It will be recognized that, in its broadest aspects, the present invention comprises (1) a method for the promotion of growth in a farm animal without leaving estrogenic residues which are absorbable upon oral ingestion which consists in systemically administering to said farm animal, in a pharmacologically acceptable dosage form, an effective growth-promoting amount of a member selected from the group consisting of (A) an estrogenic poly-phenol-phosphate polymer which is essentially of the formula:

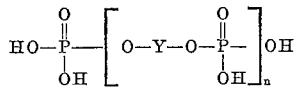

wherein —O—Y—O— is the radical of a synthetic estrogen, having two hydroxyphenyl groups connected by a two carbon atom bridge and containing at most a total of 22 carbon atoms, and wherein $n$ is a number sufficiently large that the molecular weight of the polymer molecule is higher than 2,000, preferably 10,000 and 20,000, but less than that number at which the polymer is insoluble in aqueous alkali, and (B) pharmacologically acceptable salts thereof, —O—Y—O— in the above formula preferably being the radical of a stilbene synthetic estrogen, and (2) parenteral compositions comprising (A) or (B) together with a pharmacologically acceptable solvent selected from the group consisting of water and non-toxic hydrophilic solvents, including also minor proportions of preservatives, anesthetics, or the like, if desired.

It is to be understood that the invention is not limited to the exact details of operation or exact compounds or compositions shown and described, as obvious modifications and equivalents will be apparent to one skilled in the art, and the invention is therefore to be limited only by the scope of the appended claims. This application is a continuation-in-part of our prior-filed copending application Serial Number 607,321, filed August 31, 1956 now U.S. Patent 2,964,552.

We claim:
1. A method for the promotion of growth in an incompletely finished and fattened farm animal, without leaving estrogenic residues which are absorbable upon oral ingestion, which consists in parenterally administering to said farm animal, in a pharmacologically acceptable injectable dosage form, an effective growth-promoting amount of a member selected from the group consisting of (A) an estrogenic poly-phenol-phosphate polymer which is essentially of the formula:

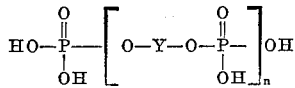

wherein —O—Y—O— is the radical of a synthetic estrogen, having two hydroxyphenyl groups connected by a two carbon atom bridge and containing at most a total of 22 carbon atoms, and wherein $n$ is a number sufficiently large that the molecular weight of the polymer molecule is higher than 2,000, but less than that number at which the polymer is insoluble in aqueous alkali, and (B) pharmacologically acceptable salts thereof.

2. A method for the promotion of growth in an incompletely finished and fattened farm animal, without leaving estrogenic residues which are absorbable upon oral ingestion, which consists in parenterally administering to said farm animal, in a pharmacologically acceptable injectable dosage form, an effective growth-promoting amount of about thirty to about four hundred milligrams of a member selected from the group consisting of (A) an estrogenic poly-phenol-phosphate polymer which is essentially of the formula:

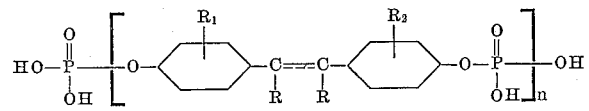

wherein $R_1$ and $R_2$ are selected from the group consisting of hydrogen and methyl, wherein the carbon bond between the two bridging carbon atoms is selected from the group consisting of a single bond and a double bond, and wherein from 1 to 2, inclusive, R groups are selected from hydrogen, lower-alkyl, lower-alkenyl, and lower-alkylidene radicals when the said bond is a single bond and from 1 to 2, inclusive, R groups are selected from hydrogen, lower-alkyl, and lower-alkenyl radicals when the said bond is a double bond, said R radicals when other than hydrogen containing not more than three carbon atoms, and wherein $n$ is a number sufficiently large that the molecular weight of the polymer molecule is higher than 2,000, but less than that number at which the polymer is insoluble in aqueous alkali, and (B) pharmacologically acceptable salts thereof.

3. A method for the promotion of growth in an incompletely finished and fattened farm animal, without leaving estrogenic residues which are absorbable upon oral ingestion, which consist in parenterally administering to said farm animal, in a pharmacologically acceptable injectable dosage form, an effective growth-promoting amount of about 225–400 milligrams of a member selected from the group consisting of (A) an estrogenic poly-phenol-phosphate polymer which is essentially of the formula:

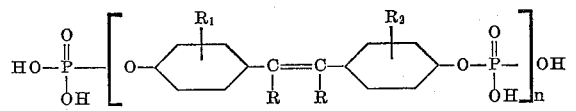

wherein $R_1$ and $R_2$ are selected from the group consisting of hydrogen and methyl, wherein from 1 to 2, inclusive, R groups are selected from hydrogen, lower-alkyl, and lower-alkenyl radicals, said R radicals when other than hydrogen containing not more than three carbon atoms, and wherein $n$ is a number sufficiently large that the molecular weight of the polymer molecule is between 10,000 and 20,000, but less than that number at which the polymer is insoluble in aqueous alkali, and (B) pharmacologically acceptable salts thereof.

4. A method according to claim 3, wherein the growth-promoting estrogenic poly-phenol-phosphate is poly-diethylstilbestrol-phosphate.

5. A method according to claim 3, wherein the growth-promoting estrogenic poly-phenol-phosphate is about 225–400 milligrams of a poly-diethylstilbestrol-phosphate salt in a concentration in a solvent of about 50–100 milligrams per milliliter.

6. A method according to claim 3, wherein a beef animal is treated with between about 0.25–1.00 milligram of a poly-diethylstilbestrol-phosphate salt per pound of body weight.

7. A method according to claim 3, wherein a beef animal is treated with between about 0.4–0.6 milligram of a poly-diethylstilbestrol-phosphate salt per pound of body weight.

8. A parenteral composition for systemic administration into incompletely finished and fattened farm animals to promote the growth thereof, without leaving estrogenic residues which are absorbable upon oral ingestion, which comprises (1) an effective growth-promoting amount of about thirty to about four hundred milligrams of a member selected from the group consisting of (A) an estrogenic poly-phenol-phosphate polymer which is essentially of the formula:

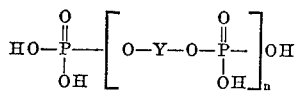

wherein —O—Y—O— is the radical of a synthetic estrogen, having two hydroxyphenyl groups connected by a two carbon atom bridge and containing at most a total of 22 carbon atoms, wherein Y is of solely hydrocarbon nature and wherein $n$ is a number sufficiently large that the molecular weight of the polymer molecule is higher than 2,000, but less than that number at which the polymer is insoluble in aqueous alkali, and (B) pharmacologically acceptable salts thereof, and (2) a pharmacologically acceptable solvent selected from the group consisting of water and non-toxic hydrophilic solvents.

9. A parenteral composition for systemic administration into incompletely finished and fattened farm animals to promote the growth thereof, without leaving estrogenic residues which are absorbable upon oral ingestion, which comprises (1) an effective growth-promoting amount of about thirty to about four hundred milligrams of a member selected from the group consisting of (A) an estrogenic poly-phenol-phosphate polymer which is essentially of the formula:

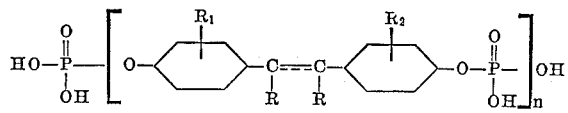

wherein $R_1$ and $R_2$ are selected from the group consisting of hydrogen and methyl, wherein the carbon-carbon bond between the two bridging carbon atoms is selected from the group consisting of a single bond and a double bond, and wherein from 1 to 2, inclusive, R groups are selected from hydrogen, lower-alkyl, lower-alkenyl, and lower-alkylidene radicals when the said bond is a single bond and from 1 to 2, inclusive, R groups are selected from hydrogen, lower-alkyl, and lower-alkenyl radicals when the said bond is a double bond, said R radicals when other than hydrogen containing not more than three carbon atoms, and wherein $n$ is a number sufficiently large that the molecular weight of the polymer molecule is higher than 2,000, but less than that number at which the polymer is insoluble in aqueous alkali, and (B) pharmacologically acceptable salts thereof, and (2) a pharmacologically acceptable solvent selected from the group consisting of water and non-toxic hydrophilic solvents.

10. A parenteral composition for systemic administration into incompletely finished and fattened farm animals to promote the growth thereof, without leaving estrogenic residues which are absorbable upon oral ingestion, which comprises (1) an effective growth-promoting amount of about 225–400 milligrams of a member selected from the group consisting of (A) an estrogenic phosphate polymer which is essentially of the formula:

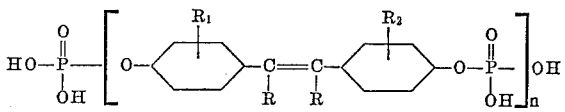

wherein $R_1$ and $R_2$ are selected from the group consisting of hydrogen and methyl, wherein from 1 to 2, inclusive, R groups are selected from hydrogen, lower-alkyl, and lower-alkenyl radicals, said R radicals when other than hydrogen containing not more than three carbon atoms, and wherein $n$ is a number sufficiently large that the molecular weight of the polymer molecule is between 10,000 and 20,000, but less than that number at which the polymer is insoluble in aqueous alkali, and (B) pharmacologically acceptable salts thereof, and (2) a pharmacologically acceptable solvent selected from the group consisting of water and non-toxic hydrophilic solvents.

11. A composition according to claim 10, wherein the growth-promoting estrogenic poly-phenol-phosphate is poly-diethylstilbestrol-phosphate.

12. A composition according to claim 10, wherein the growth-promoting estrogenic poly-phenol-phosphate is about 225–400 milligrams of a poly-diethylstilbestrol-phosphate salt in a concentration in the solvent of about 50–100 milligrams per milliliter.

References Cited in the file of this patent
UNITED STATES PATENTS
2,964,552    Hogberg _____ Dec. 14, 1960

UNITED STATES PATENT OFFICE
CERTIFICATE OF CORRECTION

Patent No. 3,053,734            September 11, 1962

Knut Bertil Högberg et al.

It is hereby certified that error appears in the above numbered patent requiring correction and that the said Letters Patent should read as corrected below.

Column 6, line 20, for "phosphate" read -- phosphatase --; columns 5 and 6, TABLE II, footnote 2, for "10X" read -- 10% --; column 9, line 22, for "in" read -- an --; line 52, for "15-20 C." read -- 15-20° C. --; column 16, line 51, for "Dec. 14, 1960" read -- Dec. 13, 1960 --.

Signed and sealed this 29th day of January 1963.

(SEAL)
Attest:

ERNEST W. SWIDER
Attesting Officer

DAVID L. LADD
Commissioner of Patents